United States Patent
Louca et al.

(10) Patent No.: US 10,771,345 B1
(45) Date of Patent: Sep. 8, 2020

(54) NETWORK MONITORING SERVICE

(71) Applicant: Amazon Technologies, Inc., Seattle, WA (US)

(72) Inventors: Andreas Louca, Seattle, WA (US); Yan Xu, Sydney (AU); Andrew Miehs, Glebe (AU); Jason Svein Ashworth, Sydney (AU); Zhiheng Gao, Sydney (AU)

(73) Assignee: Amazon Technologies, Inc., Seattle, WA (US)

( * ) Notice: Subject to any disclaimer, the term of this patent is extended or adjusted under 35 U.S.C. 154(b) by 638 days.

(21) Appl. No.: 15/393,131

(22) Filed: Dec. 28, 2016

(51) Int. Cl.
*H04L 12/24* (2006.01)
*H04L 12/26* (2006.01)
*H04L 12/751* (2013.01)

(52) U.S. Cl.
CPC .......... *H04L 41/14* (2013.01); *H04L 41/0813* (2013.01); *H04L 41/12* (2013.01); *H04L 43/0882* (2013.01); *H04L 43/16* (2013.01); *H04L 43/50* (2013.01); *H04L 45/02* (2013.01)

(58) Field of Classification Search
CPC ..... G06F 8/656; H04L 41/14; H04L 43/0882; H04L 43/16; H04L 41/12; H04L 45/02; H04L 41/0813; H04L 43/50
USPC ........................................................ 709/224
See application file for complete search history.

(56) References Cited

U.S. PATENT DOCUMENTS

| 9,886,338 B1* | 2/2018 | Khokhar | G06F 11/34 |
|---|---|---|---|
| 9,893,940 B1* | 2/2018 | Chawla | G06F 16/84 |
| 10,019,195 B1* | 7/2018 | Azmandian | G06F 3/0653 |
| 2005/0108582 A1* | 5/2005 | Fung | G06F 1/3203 713/300 |
| 2006/0083186 A1* | 4/2006 | Handforth | H04W 88/085 370/310 |
| 2008/0151820 A1* | 6/2008 | Solis | H04W 74/04 370/329 |
| 2009/0135716 A1* | 5/2009 | Veillette | G01D 4/004 370/221 |
| 2011/0231833 A1* | 9/2011 | Narayanan | G06F 8/656 717/171 |
| 2014/0297818 A1* | 10/2014 | Loewenthal | H04L 61/2015 709/221 |
| 2015/0381407 A1* | 12/2015 | Wang | H04L 41/0663 370/221 |
| 2016/0248626 A1* | 8/2016 | Vernia | H04L 41/0806 |
| 2017/0346684 A1* | 11/2017 | Ratkovic | H04L 41/0803 |
| 2018/0054772 A1* | 2/2018 | Tan | H04L 41/12 |

* cited by examiner

*Primary Examiner* — Chris Parry
*Assistant Examiner* — Adam A Cooney
(74) *Attorney, Agent, or Firm* — Klarquist Sparkman, LLP

(57) ABSTRACT

The following description is directed to a network monitoring service. In one example, a method can include receiving a query including a reference to a logical device of a network and an action to perform on the logical device. The logical device can include a plurality of interconnected network devices. The method can include determining whether the action can be performed on the logical device based at least on combining scores of the network devices of the logical device. The score of an individual network device can be calculated by recursively calculating scores of neighboring network devices of the individual network device. The method can include transmitting a response indicating whether the action can be performed on the logical device.

20 Claims, 8 Drawing Sheets

NETWORK MONITORING SERVICE

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation.

Large computer systems, including cloud computing facilities, can include many compute resources connected by an internal communications network. The network can include many network components or devices that may need to be upgraded or reconfigured during the operational lifetime of the computing facility. The compute service provider may desire to provide high availability and throughput through the network, even during an upgrade or reconfiguration of the network.

DETAILED DESCRIPTION

Figure 1:
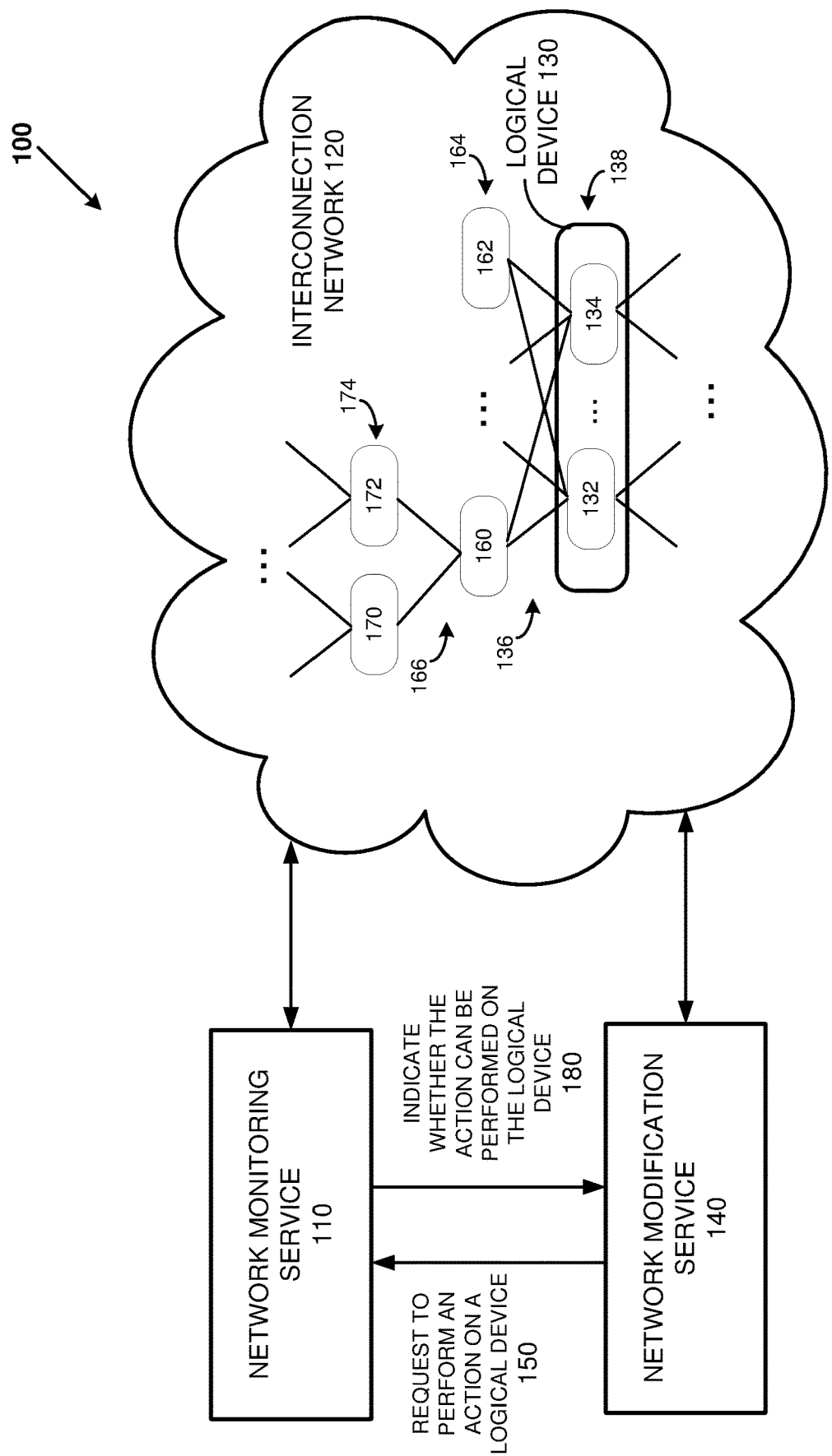
FIG. 1 is a system diagram showing an example system for forwarding network traffic, the system including a network monitoring service and an interconnection network.

Large computer systems can include many compute resources connected by an internal communications network. Computer networks generally comprise various interconnected computing devices that can communicate with each other via packets to exchange data. When small numbers of devices are interconnected, the devices can be directly connected to each other. For example, one device can be directly connected to another device via a network link and the devices can communicate by sending packets to one another over the network link. However, direct connections between large numbers of devices is generally not scalable. Thus, the connections between large numbers of devices will typically be via indirect connections. For example, one device can be connected to another device via an interconnection network comprising one or more routers.

Large routers for connecting many devices together can be expensive. However, large routers can be constructed from lower cost commodity equipment interconnected as a network fabric. A network fabric can include multiple nodes interconnected by multiple network links. A node can include a network device that can originate, transmit, receive, forward, and/or consume information within the network. For example, a node can be a router, a switch, a bridge, an endpoint, or a host computer. The network fabric can be architected or organized in various ways which can be described by a topology of the network. Specifically, the topology of the network can describe the connectivity of the nodes and links of the communication system. As one example, the network fabric can be organized as a hierarchy of interconnected components. In particular, the network devices can be organized by rows or tiers. The network devices within a tier are generally not directly connected to each other, and the network devices within a given tier can be fully or partially connected to a neighboring tier. Thus, the different devices within a tier can provide redundant connections to a neighboring tier to potentially increase bandwidth and/or availability between the tiers. Additionally or alternatively, the network devices can be grouped into logical devices. For example, the network devices can be grouped into logical devices that describe the connectivity of the devices within the group. Exemplary logical devices can include multi-tier architectures such as Clos, folded-Clos, fat-tree, butterfly, flattened-butterfly, and dragonfly networks. By grouping the individual network devices into larger logical devices and/or tiers, the architecture of the overall network can be more readily discernable to a network engineer and the network devices within a logical device can be managed as a group.

A compute service provider may desire to provide high availability and throughput through the network. For example, a goal of the service provider can be to keep customer traffic flowing at all times, even during a network upgrade or reconfiguration of the network. For example, hardware, software, and/or software state of the network devices can change during the lifetime of the network devices as users are added or removed, services are added or deprecated, software is upgraded and/or patched, other network devices are deployed, and new security threats are discovered. The network upgrade or reconfiguration can be managed using software services to monitor and to automatically update the individual network devices. In particular, the health of all or a portion of the network can be monitored by a network monitoring service (NMS) or a network health service (NHS). For example, the network health service can provide authoritative answers about the health of a communications network and its components. Specifically, the network health service can provide a go/no-go signal to automated deployment systems that are requesting to update all or portions of the network. As another example, the network health service can provide a health condition of a device or a logical device. As another example, the network health service can determine whether a number of devices can be taken out of service from a particular logical device without impacting customer traffic.

The network health service can model a network and determine whether it is safe to take a device or logical device out of service to potentially minimize or eliminate customer impact while enabling an efficient deployment of an updated network configuration. In particular, the network health service can generate a network topology of the network, where the network includes network devices arranged in one or more tiers and/or logical devices. The network health service can receive a query, such as from a deployment service, requesting whether an action can be performed on a logical device of the network. The network health service can use the generated network topology to calculate a health score for the logical device, and the action can be performed on the logical device when the calculated score exceeds a threshold.

The health score for the logical device can be based on a combination of health scores of the individual network devices of the logical device. For example, the health of a single network device can be a function of whether it can be expected to send any packets onwards without expecting to encounter any congestion, which could potentially lead to packet loss. The network health service can analyze the ability of a device to forward network traffic by examining the device's available bandwidth to other neighboring tiers of the network, and whether the neighboring tiers can in turn be expected to forward the network traffic. Thus, the health of an individual network device can be a function of the health of its neighbors, its neighbors-neighbors, and so on. In particular, the health score of an individual network device can be calculated by recursively analyzing properties of network devices in tiers neighboring the individual network device.

The health scores of the individual network devices of the logical device can be combined to generate a health score of the logical device (e.g., a Clos network). Thus, the network health service can answer health queries for a logical device, treating it as a common unit, rather than only assessing the health of a single network device. The health scores of the individual network devices can be combined in various different ways. For example, a tier for each of the individual network devices can be identified, and the score assigned to a particular tier can be a minimum of the health scores for all of the network devices belonging to the particular tier. The health score for the logical device can be the minimum of the health scores for the tiers of the logical device. Thus, the health score for the logical device can be based on the current health condition of its individual components. Additionally or alternatively, the health score for the logical device can be based on taking a proposed action, such as removing, for one or more of the network devices of the logical device. Specifically, the network health service can answer prospective queries about network health for a proposed action to be taken (e.g., a "what if" query), by also calculating the health impact that the proposed action would have on the whole network fabric. As one example, the network health service can answer a predictive health query requesting whether a Clos fabric would still be considered healthy if a specific set of devices within the Clos fabric were to be taken out of service. By providing an analysis of proposed actions, the network health service can potentially provide additional information over services that can only assess network health of devices in their current known state.

The health score of the logical device can be used to determine whether an action on the logical device can be performed. If the health score of the logical device exceeds a threshold or some other criteria, the action on the logical device can be performed. For example, the action on can be performed by the network health service, an automated deployment service, or another service.

FIG. 1 is a system diagram showing an example system 100 for forwarding network traffic over an interconnection network 120. The system 100 can include a network monitoring service 110, a network modification service 140, and the interconnection network 120. The network monitoring service 110 and the network modification service 140 can include software and/or hardware executing on one or more host server computers in communication with the interconnection network 120. The network monitoring service 110 and the network modification service 140 can be network-accessible services, such as web services. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request interfaces, along with a definition of the structure of the messages used to invoke the API and the response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request.

The interconnection network 120 can be configured to transmit packets using one or more communications protocols. Routing through the interconnection network 120 can be based on addresses associated with one or more layers of the Open Systems Interconnection (OSI) model. The OSI model standardizes and partitions the internal functions of a communication system into abstraction layers. For example, the interconnection network 120 can be configured to communicate using User Datagram Protocol (UDP) packets (layer 4, the transport layer, of the OSI model) over Internet Protocol (IP) (layer 3, the network layer, of the OSI model) over Ethernet (layer 2, the data link layer, of the OSI model). In an alternative embodiment, the interconnection network 120 can be configured to communicate with Infiniband, Fibre Channel, RapidIO, or another communications protocol.

The interconnection network 120 can include multiple network devices (such as devices 132, 134, 160, 162, 170, and 172). Network devices can include switches (multilayer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. The network devices can be organized in an architecture or fabric that can be described by a topology of the network. The topology of the network can describe any relationships and/or interconnections among the different network devices. For example, the network devices can be grouped into logical devices, such as the logical device 130. In particular, a logical device can include one or more network devices arranged in a manner to perform a routing or forwarding function within the interconnection network 120. Examples of logical devices include single-tier architectures such as a pair of redundant routers, and multi-tier architectures such as Clos, folded-Clos, fat-tree, butterfly, flattened-butterfly, and dragonfly networks. The network devices within a given tier share at least one interface group or link group. An interface group is a group of network connections that directly connect one tier to a neighbor tier.

As a specific example, the logical device 130 includes the network devices 132 and 134. The network devices 132 and 134 are within a tier 138 of the logical device 130 and they share an interface group 136 that connects to a tier 164. The tier 164 includes network devices 160 and 162. The network device 160 is connected to the network devices 170 and 172 that are within a tier 174. The network device 160 is connected to the network devices 170 and 172 via interface group 166. The tier 138 is directly connected to the neighbor tier 164 via interface group 136, and indirectly connected to the neighbor-neighbor tier 174 via the tier 164 and interface groups 136 and 166. A neighbor tier is one hop away, where a hop occurs each time a packet passes through a network device. A neighbor-neighbor tier is two hops away. The tier 164 is directly connected to the neighbor tier 138 via the interface group 136, and the tier 164 is directly connected to the neighbor tier 174 via the interface group 166. Tiers and/or logical devices can be fully or partially connected to each other. When a first tier is fully connected or fully meshed with a second tier, every network device of the first tier is directly connected by a network connection to every network device of the second tier. In contrast, a first tier is partially connected or partially meshed with a second tier when every network device of the first tier is not directly connected by a network connection to every network device of the second tier.

The interconnection network 120 can be used to route network traffic among the different nodes of the interconnection network 120. The amount or bandwidth of traffic routed through the interconnection network 120 can be a function of the architecture of the interconnection network 120 and the operational status of the network devices and links of the interconnection network 120. The architected or installed capacity can be a function of how the different network devices are interconnected or cabled together and a speed of the links connecting the different network devices. As a specific example, the installed capacity between two tiers can be 40 gigabits per second (Gbps) when there are four 10 Gbps links connecting the two tiers.

The installed capacity between two tiers can be reduced based on the operational status of the network devices of the tiers and the links between the tiers. The operational status of the network devices can include states such as up, down, and shifted. An "up" network device is operational and configured to forward network traffic. A "down" network device is unavailable to forward network traffic for various reasons, such as the device being powered down, the device having a hardware or software malfunction, or the device being in a boot-up sequence. A "shifted" network device is unavailable to forward network traffic because a network engineer or a network management service (such as the network modification service 140) has removed the device from operation (such as by removing the device from routing tables of neighboring devices). A shifted device can appear operational to some services since it can respond to requests and some or all of its links may be up. The operational status of the links can include states such as up, down, or reduced. An "up" link is operational to forward network traffic at the architected rate of the link (e.g., 10 Gbps). A "down" link is unavailable to forward any network traffic. A "reduced" link is operational to forward network traffic at less than the architected rate of the link (such as when a member of a link aggregation group (LAG) is down, but the LAG is operational).

The effective capacity between two links or tiers can be a measure of the amount of traffic that can be transferred before the link or tier congests. The effective capacity can account for a reduction of installed capacity due to the operational status of the network devices and the links between the devices. Additionally, the effective capacity can account for additional losses in the installed capacity, such as unequal hashing over an interface group. For example, the network traffic can be forwarded across an interface group using an equal cost multipath (ECMP) routing algorithm. The ECMP algorithm can hash on fields associated with one or more OSI layers of a packet header to determine which network link of the interface group can transmit the packet. For example, the ECMP hash function can use the source address, destination address, source port, and destination port fields of the TCP and the IP layers. Thus, a distribution of network traffic having packets with different header fields can be distributed across different links of the interface group. Given a large amount of traffic from different sources, the hash function may produce traffic that is evenly distributed across the interface group. However, for a given network architecture and set of network traffic, the hash function may produce traffic that is not evenly distributed across the interface group. The overall effective capacity through a multi-tier network can be a function of the effective capacity through each tier. For example, in a three-tier network using ECMP routing where each tier has an equivalent installed capacity, the effective capacity through the three-tier network can be limited by the tier having the lowest effective capacity. As a specific example, if the effective capacity of the tiers is 1.0, 0.7, and 0.9, respectively, of the installed capacity, the overall effective capacity of the three-tier network can be 0.7 (the lowest effective capacity of the tiers). Thus, analyzing a tier in isolation may provide an overly optimistic view of the traffic that can flow through the tier since the traffic may hit a bottleneck in a downstream tier. However, by accounting for the effective capacity through tiers one, two, or more hops away, a more accurate analysis of the traffic flow can potentially be obtained.

Utilization is a measure of the amount of capacity that is being used by the network traffic. The utilization can be calculated based on the architected capacity or the effective capacity. The amount of network traffic can be measured in various ways. As one example, the amount of network traffic can be measured as the amount of traffic that was sent over a given amount of time period (e.g., a minute or an hour). As another example, the amount of network traffic can be measured as a rolling average of the amount of traffic that was sent over a series of time periods. As another example, the amount of network traffic can be measured as a peak amount of traffic that was sent over a time period. As a specific example, the amount of network traffic can be measured as the ninety-ninth percentile of peak bandwidth measured over the last seven days, the ninetieth percentile of peak bandwidth measured over the last thirty days, and so forth.

The network monitoring service 110 and the network modification service 140 can be used to manage device outages, reconfigurations, and/or upgrades to the interconnection network 120 while customer network traffic continues to flow through the interconnection network 120. In particular, the network monitoring service 110 can monitor the operational state of the network devices, logical devices, and links of the interconnection network 120. The network monitoring service 110 can receive and/or generate a network topology of the interconnection network 120 so that potential changes to the interconnection network 120 can be modelled. For example, the network modification service 140 can send a request 150 to the network monitoring service 110 requesting whether an action on a logical device can be performed. The network monitoring service 110 can analyze the request and indicate 180 whether the action on the logical device can be performed. The network modification service 140 can selectively perform the action on the logical device based on the indication 180 from the network monitoring service 110. It should be noted that the functions of the network monitoring service 110 and the network modification service 140 can be combined into a single service or split differently among a set of services.

The network modification service 140 can perform various actions on the network devices of the interconnection network 120. As one example, the network modification service 140 can automatically deploy new software and/or configuration data to the network devices when it is determined that the current software and/or configuration data stored on the network devices is ready for an update. For example, the network modification service 140 can compare the software and configuration versions installed on each network device and schedule the network devices for an update when there is a more current version of the software or configuration information. The configuration information of a network device is a set of states that describes how the network device operates. For example, the configuration information can include addressing information, routing information, access control lists, access credentials, address translations, quality of service parameters, statistical gathering capabilities, protocol support, timer values, encryption parameters, device-specific tuning parameters, and/or any other information suitable for controlling and/or monitoring how the network device operates. When the network device is updated or configured with the configuration information, the network device will operate according to the network device configuration. When the configuration data or software is installed on a network device, the network device may be unavailable for forwarding customer traffic because the network device may be rebooted or the configuration data can be in a state of flux which could potentially cause network traffic to be dropped, corrupted, or misrouted. Thus, the network modification service 140 or another service can shift customer traffic off of the network device to be reconfigured before configuring the network device so that the customer traffic can flow without interruption or corruption. Shifting network traffic off of the network device can include reprogramming routing tables of other network devices to forward traffic through network paths that exclude the shifted network device. However, taking a network device off-line or shifting network traffic off of the network device can potentially cause congestion in other parts of the interconnection network 120. Congestion can potentially cause degraded network performance, such as dropped packets, and variable latencies or jitter of packets traversing the interconnection network 120. Thus, the network modification service 140 can potentially increase the quality of service of the interconnection network 120 by only scheduling an upgrade of a network device or logical device when the network monitoring service 110 indicates that the action on the logical device can be performed.

Additionally, the network modification service 140 can perform various actions on the logical devices of the interconnection network 120. For example, the network devices of a logical device can be treated as a unit by the network modification service 140. In particular, the network modification service 140 can sequence actions to the individual network devices of the logical device so that the logical device can continue to perform its intended function. The logical device can include excess capacity, redundant network paths, and redundant network devices so that the logical device can continue to forward network traffic without congesting while shifting traffic away from a particular network device or network path (such as while the particular network device is being reconfigured). As one example, the network modification service 140 can sequentially update each network device of the logical device, one at a time, so that the network modification service 140 never shifts traffic away from or takes down more than one network device of the logical device at a time. As another example, and if there is enough excess capacity, the network modification service 140 can update multiple network devices of the logical device concurrently in such a manner so that traffic flowing through the logical device does not congest or get dropped. In particular, an updated configuration or software patch can be deployed to each of the network devices of the logical device in a sequence where network devices in different tiers are deployed concurrently. The network can potentially be updated more rapidly when the deployment occurs on network devices in multiple tiers. Additionally, the network traffic flowing through the logical device may be less congested when network devices from multiple tiers are updated as opposed to a similar number of network devices being updated from within a single tier.

The network monitoring service 110 can model the traffic flow through a network device, a logical device, and/or the interconnection network 120. Specifically, the network monitoring service 110 can generate a network topology of the interconnection network 120, gather the operational status of the network devices and links of the interconnection network 120, and apply or annotate the operational status of the network devices and links to the generated network topology. Using the annotated topology, the network monitoring service 110 can generate a health score for the network device, the logical device, and/or the interconnection network 120. Generally, the health score of an individual network device can be determined as a function of whether the network device is likely to pass network traffic without dropping packets. The health score can be generated based on the network topology of the devices in the neighborhood of the network device, the operational state of the devices in the neighborhood of the network device, the operational state of network links or groups of links connecting the network device to the neighboring devices, and traffic utilization data (such as current or peak traffic. The health score of a logical device can be determined by calculating health scores for all of the network devices of the logical device, and then combining the scores (such as by taking a minimum) of the devices to generate an overall health score for the logical device.

Specifically, the network monitoring service 110 can recursively calculate a health score of a particular network device by using health scores of its neighboring network devices of the individual network device. It should be noted that the neighboring network devices can be within the logical device containing the particular network device or outside of the logical device containing the particular network device. A health score for a logical device can be calculated by combining the health scores of the network devices incorporated in the logical device. A depth of recursion for calculating the health score of a particular network device can be a function of a type of logical device incorporating the particular network device or its neighboring network devices. The depth of recursion is a measure of how many network hops are traversed when calculating a device's score. For example, a depth of one refers to calculating a network device's score based on the properties of network devices one hop away, a depth of two refers to calculating a network device's score based on the properties of network devices one and two hops away, and so forth.

As one example, a one-hop score can be determined for a network device. First, the annotated network topology can be used to identify an interface group for each of the interfaces of the network device. For each interface group, the one-hop score can be the ratio of available interfaces to the architected interfaces. An interface can be available when the interface is up, the link from the interface is up, and the network device connected to the link is not down or shifted. When the network device has multiple interface groups, the one-hop score can be the minimum of one-hop scores of the non-zero interface groups. The one-hop score can be calculated for the terminating or base case of the recursion at the depth of the recursion. A specific example of calculating a one-hop score is described further below with reference to FIG. 2.

As another example, a two-hop score can be determined for a network device. The two-hop score can be calculated for the network devices one level above (less deep) the terminating or base case of the recursion. The two-hop score can be calculated based on the one-hop scores of the neighboring network devices. First, the annotated network topology can be used to identify an interface group for each of the interfaces of the network device. For each interface group, the two-hop score can be the percentage of available devices multiplied by the minimum of the non-zero one-hop scores of the available devices attached to the links of the interface group, or:

$$score_2 = \min(score_1) \times \rho_1,$$

where $score_2$ is the two-hop score, pi is the percentage of available devices and $score_1$ are the non-zero one-hop scores of the available devices attached to the links of the interface group. The available devices attached to the links of the interface group are connected to a link that is up. Alternatively, the two-hop score for a given interface can be the percentage of available devices multiplied by the minimum of the one-hop scores of the available devices over a threshold score, where the available devices are attached to links of the interface group that are operational. As another alternative, the two-hop score for a given interface can be the minimum of the one-hop scores of the available devices, where the available devices are attached to up or down links of the interface group. A specific example of calculating a two-hop score is described further below with reference to FIG. 3.

The network monitoring service 110 can combine the scores of the network devices of the logical device to determine a health score of the logical device. For example, the health score of the logical device can be the minimum of the health scores of the devices associated with a tier of the logical device. As one example, the logical device has one tier, the depth of recursion is one, and the health score of the logical device is the minimum of the one-hop scores of each of the network devices of the logical device. As another example, the logical device has one tier, the depth of recursion is two, and the health score of the logical device is the minimum of the two-hop scores of each of the network devices of the logical device. As another example, the logical device has two tiers and the depth of recursion is one. The health scores for each tier of the logical device can be calculated as the minimum of the one-hop scores of each of the network devices of the tier. The health score of the logical device can be the minimum of the health scores for each tier.

The health score of the logical device can be used to determine whether an action can be performed on the logical device. As one example, the health score can be compared to a threshold score to determine whether an action can be performed on the logical device. The logical device can be considered unhealthy if the health score for the logical device is less than a threshold value (such as 0.75 or 0.9). When the logical device is unhealthy, the action may be deferred until a remedial action is taken to increase the health score of the logical device. As another example, an available capacity can be generated by multiplying the health score by the architected capacity; an available capacity ratio can be generated by dividing a measure of the network traffic (such as a latest snapshot of the rate or traffic, or a peak rate of traffic over the last few days) through the logical device by the available capacity; the available capacity ratio can be compared to a threshold value; and the action can be performed on the logical device when the available capacity ratio exceeds the threshold value.

The threshold values can be based on the action to perform. For example, the threshold can be higher when the action is to reconfigure multiple network devices of a logical device concurrently than when the action is to sequentially reconfigure the network devices of a logical device one at a time. The threshold can be based on a type of architecture of the logical device. As one example, the threshold can be proportional to a number of redundant paths through a tier of the logical device, so that a logical device having a greater number of redundant paths through a tier can have a higher threshold than a logical device having a smaller number of redundant paths. The threshold can be based on a utilization of the logical device. For example, the threshold can be based on an average or a peak utilization of one or more tiers of the logical device.

Figure 2:
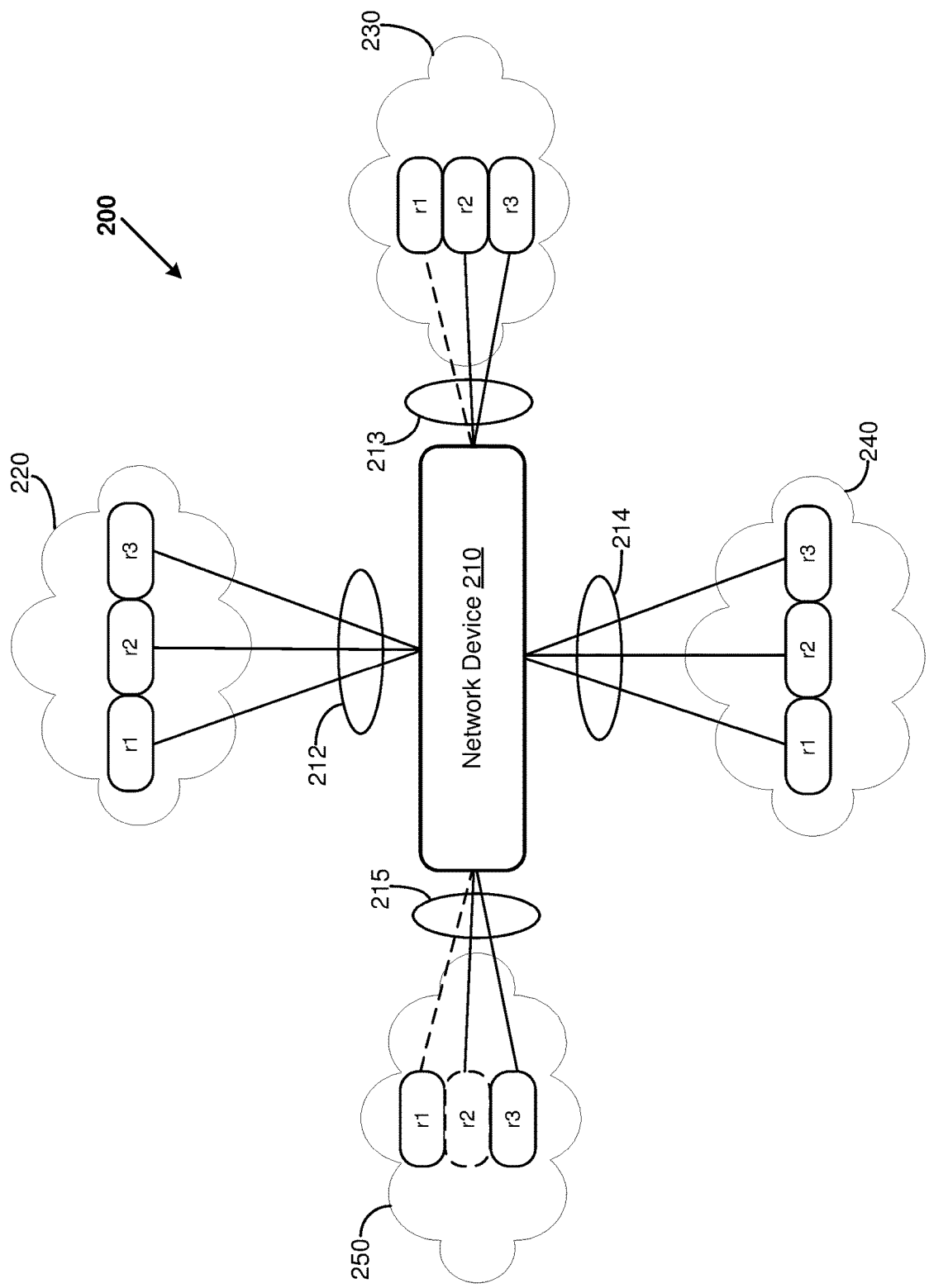
FIG. 2 illustrates aspects of calculating a score of an individual network device by recursively calculating scores of neighboring network devices to a depth of one hop.

FIG. 2 illustrates an example of calculating a score of an individual network device 210 within a network 200. Specifically, a one-hop score of the network device 210 can be calculated using the properties of neighbor network devices one hop away and the properties of the links connecting the network device 210 to the neighbor network devices. The network device 210 can be one device within a tier of a logical device. The network device 210 can connect to four other tiers 220, 230, 240, and 250 which can each be within the same logical device as network device 210 or within a different logical device. The network device 210 connects to the four other tiers 220, 230, 240, and 250 via interface groups 212, 213, 214, and 215, respectively. As illustrated, each of the interface groups includes three network links for connecting to three different network devices (e.g., routers r1, r2, and r3). Scores corresponding to an interface group can be based on the operational properties of the links of the interface group and the operational properties of the network devices connected by the links of the interface group. As one example, the one-hop score corresponding to an interface group can be the ratio of available interfaces to architected interfaces. An interface is unavailable when the link connected to the interface is down or non-operational (as illustrated, a down link is represented by a dotted line) or the network device connected to the link is shifted, down, or non-operational (as illustrated, an unavailable network device is represented by a dotted outline). Specifically, all three routers in tier 220 are up or operational and all links of the interface group 212 are up or operational so the score corresponding to the interface group 212 can be 3/3 or 1.0. All three routers in tier 230 are up, but one of the three links of the interface group 213 is down so the score corresponding to the interface group 213 can be 2/3 or 0.67. All three routers in tier 240 are up and all links of the interface group 214 are up so the score corresponding to the interface group 214 can be 3/3 or 1.0. Only two of the three routers in tier 250 are up and two of the three links of the interface group 215 are up (and the down link is connected to an up router) so the score corresponding to the interface group 215 can be ⅓ or 0.33.

The scores of the interface groups 212, 213, 214, and 215 can be combined to calculate a one-hop score for the network device 210. As one example, the one-hop score for the network device 210 can be a minimum of the scores for the interface groups 212, 213, 214, and 215 which is 0.33. A score for a logical device containing the network device 210 can be calculated by combining the score of the network device 210 with scores of other network devices of the logical device.

Figure 3:
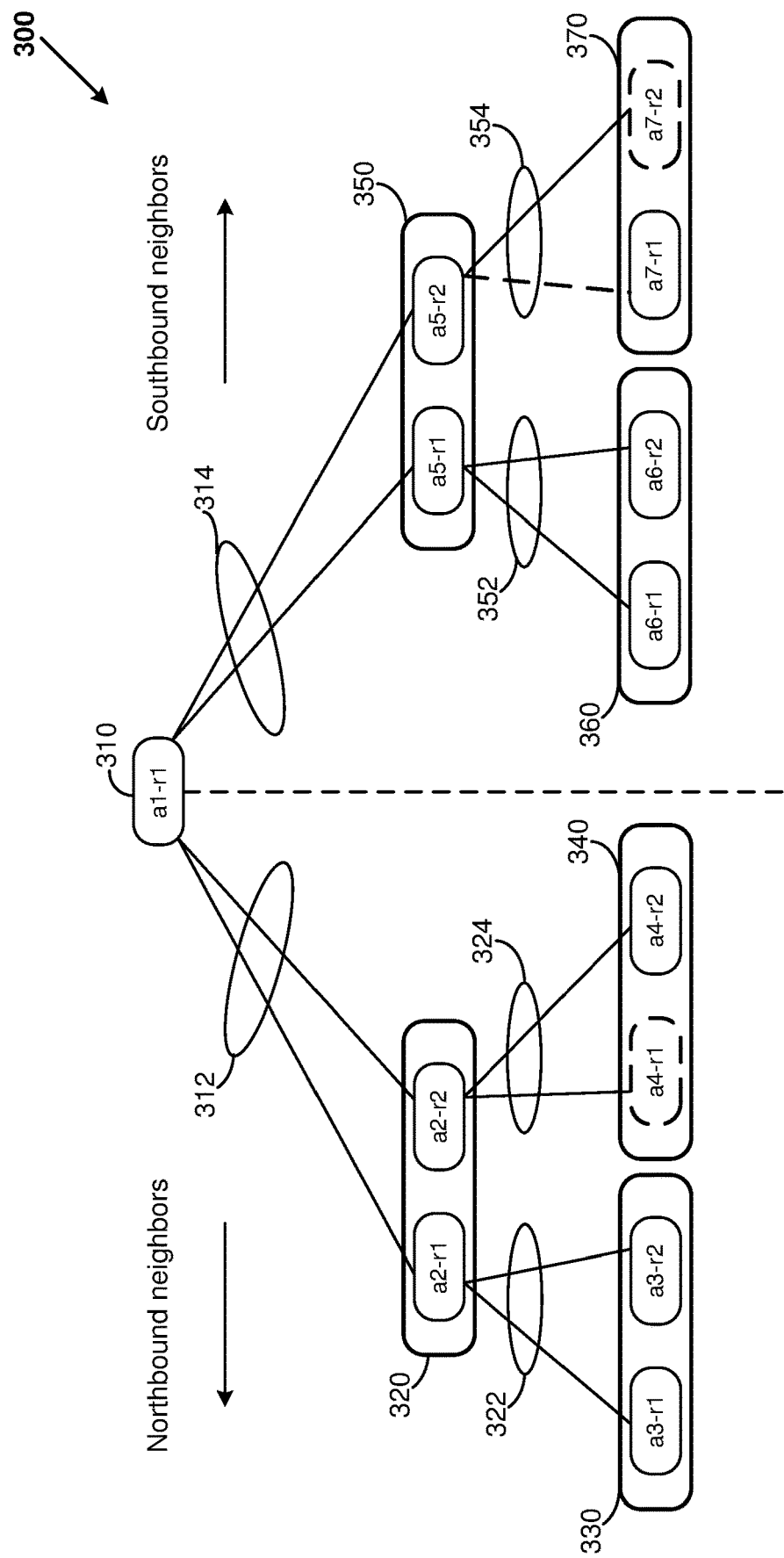
FIG. 3 illustrates aspects of calculating a score of an individual network device by recursively calculating scores of neighboring network devices to a depth of two hops.

FIG. 3 illustrates an example of calculating a score of an individual network device 310 within a network 300. Specifically, a two-hop score of the network device 310 can be calculated using the properties of neighboring network devices one and two hops away and the properties of the links in the shortest path between the network device 310 and the neighboring network devices. The network device 310 can be one device within a tier of a logical device. The network device 310 can directly connect to two other tiers 320 and 350 via interface groups 312 and 314, respectively. The network devices a2-r1, a2-r2, a5-r1, and a5-r2 of tiers 320 and 350 are one hop away. The network device 310 can indirectly connect to the network devices of four other tiers 330, 340, 360, and 370 that are two hops away. Each of the different tiers 320, 330, 340, 350, 360, and 370 can be within the same logical device as network device 310 or within a different logical device. The neighboring devices of the network device 310 can be discovered by performing a recursive or non-recursive node traversal of the network topology where the starting node is the network device 310. For example, a depth-first search or a breadth-first search can be used to identify the neighboring devices of the network device 310 that are reachable within a depth of recursion (e.g., two hops away). The node traversal can be combined with the score calculation.

The two-hop score for the network device 310 can be calculated by recursively calculating scores of the neighboring network devices of the network device 310. In particular, the calculation can begin by identifying the interface groups 312 and 314 of the network device 310. One of the tiers 320 or 350 connected to one of the interface groups 312 and 314 can be selected and the interface groups from the selected tier can be identified. As a specific example, the tier 320 can be selected, and the interface groups 322 and 324 can be identified. The operational properties of the links of the interface groups 322 and 324 and the operational properties of the network devices connected by the links of the interface groups 322 and 324 can be used to calculate a one-hop score for the devices a2-r1 and a2-r2 and the tier 320. In particular, both devices a3-r1 and a3-r2 in tier 330 are up and all links of the interface group 322 are up so the score corresponding to the device a2-r1 can be 2/2 or 1.0. Only the device a4-r2 is up in the tier 340 and all links of the interface group 324 are up so the score corresponding to the device a2-r2 can be ½ or 0.5.

The score associated with the tier 320 or the interface group 312 can be calculated by combining the one-hop scores of the devices a2-r1 and a2-r2 in various different ways. As one example, the score associated with the tier 320 can be the minimum of the scores of a2-r1 and a2-r2 which is 0.5. As another example, the score associated with the tier 320 can be an average or a weighted average of the scores of a2-r1 and a2-r2. The score of each device can be weighted by a capacity of traffic that the device can propagate. If the devices can propagate the same amount of traffic, the average score is 0.75. As another example, a minimum of the scores of the a2-r1 and a2-r2 devices can be determined, and the minimum can be multiplied by the number of links of the interface group 312. The minimum of the scores of the a2-r1 and a2-r2 devices is 0.5 and there are two links in the interface group 312 so the score associated with the interface group 312 can be 1.0. As another example, thresholded scores of the a2-r1 and a2-r2 devices can be combined. In particular, each of the scores of the a2-r1 and a2-r2 devices can be compared to a threshold value. If a score exceeds the threshold value (such as 0.75), the score can be rounded up to 1.0. If the score is less than the threshold value, the score can be rounded down to 0.0. Using a threshold of 0.75, the rounded score for the a2-r1 device is 1.0 and the rounded score for the a2-r2 device is 0.0. The rounded values can be combined, by taking a minimum (e.g., 0.0), an average (e.g., 0.5), or a sum (e.g., 1.0).

When all of the nodes within the depth of recursion reachable from the interface group 312 have been scored, the scores can be calculated for the nodes reachable from the interface group 314. The links of the interface group 314 are connected to the network devices a5-r1 and a5-r2 of the tier 350 which are one hop away. The network device a5-r1 is connected by the links of interface group 352 to the network devices a6-r1 and a6-r2 of the tier 360. Both links of the interface group 352 are up and both of the network devices a6-r1 and a6-r2 are up so the one-hop score for the device a5-r1 is 1.0. The network device a5-r1 is connected by the links of interface group 354 to the network devices a7-r1 and a7-r2 of the tier 370. The link of the interface group 354 connecting to the operational network device a7-r1 is down and the network device a7-r2 is down or shifted so the one-hop score for the device a5-r2 is 0.0.

As with the tier 320, the score associated with the tier 350 or the interface group 314 can be calculated by combining the one-hop scores of the devices a5-r1 and a5-r2 in various different ways. As one example, the score associated with the tier 350 can be the minimum of the scores of a5-r1 and a5-r2 which is 0.0. As another example, the score associated with the tier 320 can be an average or a weighted average of the scores of a5-r1 and a5-r2. The score of each device can be weighted by a capacity of traffic that the device can propagate. If the devices can propagate the same amount of traffic, the average score is 0.5. As another example, a minimum of the scores of the a5-r1 and a5-r2 devices can be determined, and the minimum can be multiplied by the number of links of the interface group 314. The minimum of the scores of the a5-r1 and a5-r2 devices is 0.0 and there are two links in the interface group 314 so the score associated with the interface group 314 can be 0.0. As another example, thresholded scores of the a5-r1 and a5-r2 devices can be combined. In particular, each of the scores of the a5-r1 and a5-r2 devices can be compared to a threshold value. If a score exceeds the threshold value (such as 0.75), the score can be rounded up to 1.0. If the score is less than the threshold value, the score can be rounded down to 0.0. Using a threshold of 0.75, the rounded score for the a5-r1 device is 1.0 and the rounded score for the a2-r2 device is 0.0. The rounded values can be combined, by taking a minimum (e.g., 0.0), an average (e.g., 0.5), or a sum (e.g., 1.0).

The score of the network device 310 can be calculated by combining the scores associated with the tiers 320 and 350. For example, the score of the network device 310 can be a minimum, a thresholded minimum, an average, a weighted average, a sum, or other combination of the scores of the tiers 320 and 350. The score of the network device 310 can be used to calculate a score for a logical device incorporating the network device 310. Specifically, the score of the network device 310 can be combined with the scores of other network devices of the logical device to calculate the score for the logical device incorporating the network device 310.

Figure 4:
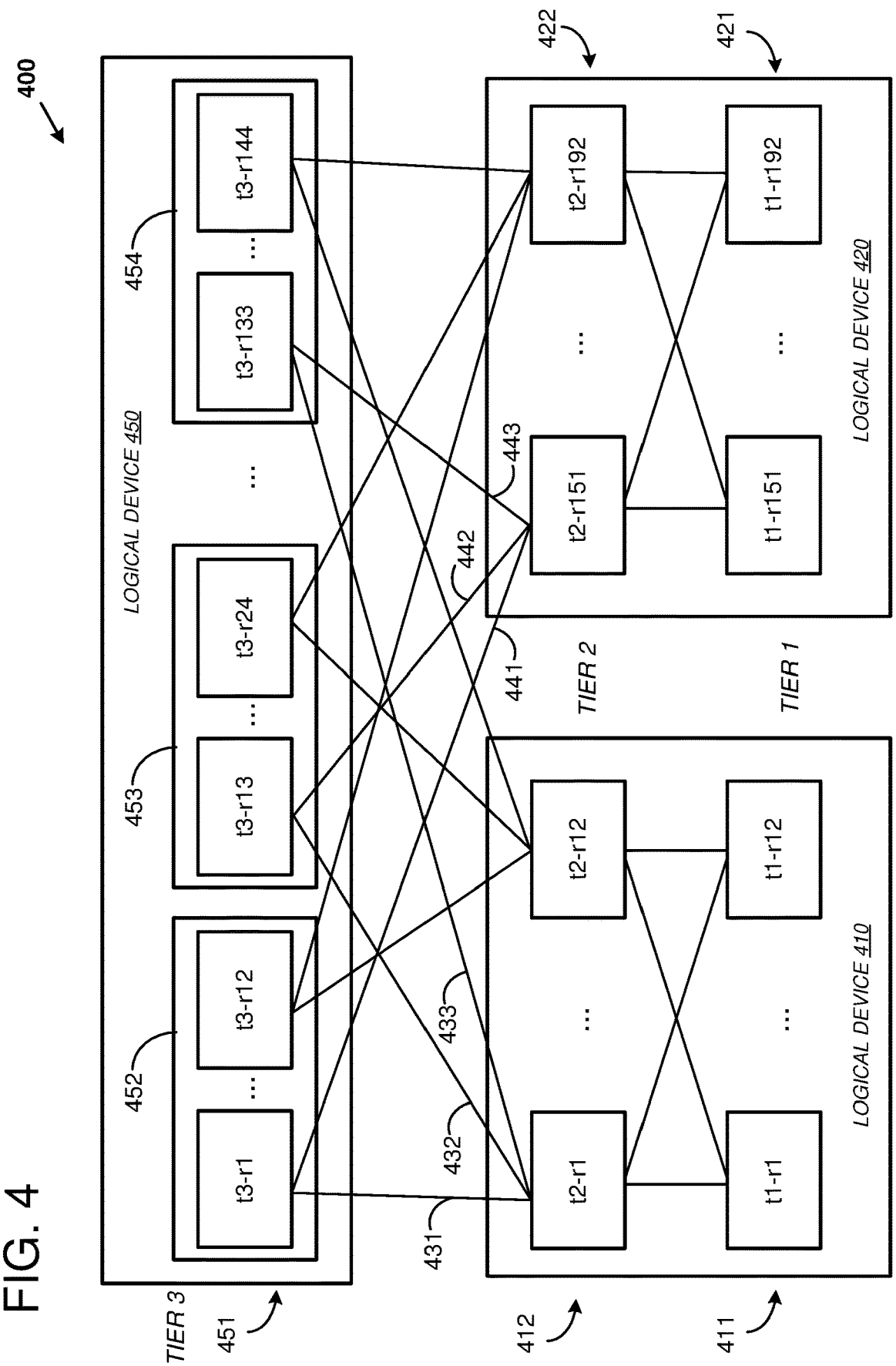
FIG. 4 is a system diagram showing an example interconnection network comprising a plurality of network devices arranged in one or more tiers.

FIG. 4 is a system diagram showing an example interconnection network 400 comprising a plurality of network devices arranged in multiple logical devices and multiple tiers. For ease of illustration, only some of the network devices and the network connections among the devices are shown. The logical device 410 includes twenty-four network devices arranged in two tiers 411 and 412. The network devices of the tier 411 are fully meshed with the network devices of the tier 412. In other words, every network device in the tier 411 is connected to every network device in the tier 412. Thus, there are twelve redundant paths between the tiers 411 and 412. Packets can be forwarded between the devices of the tiers using an ECMP forwarding algorithm so that the network traffic can be distributed among the different paths. At least some of the devices of the tier 411 are connected to endpoint devices (not shown). An endpoint (EP) can be a source of network packets and a destination for network packets. Similarly, the logical device 420 includes twenty-four network devices arranged in two tiers 421 and 422 that are fully meshed.

The logical device 450 includes 144 network devices arranged in twelve groups 452-454, where each group includes twelve network devices. The logical devices can be hierarchical, so that one logical device can include other logical devices. For example, each of the groups 452-454 can be a different logical device so that the logical device 450 can include the logical devices 452-454. The logical device 450 can be arranged in a single tier 451. The network devices of the logical device 450 can be partially meshed with the network devices of the logical devices 410 and 420. As a specific example, an interface group comprising the connections 431-433 can be used to connect the network device t2-r1 of the logical device 410 to the network devices t3-r1, t3-r13, and t3-r133, respectively, of the logical device 450. As another example, an interface group comprising the connections 441-443 can be used to connect the network device t2-r133 of the logical device 420 to the network devices t3-r1, t3-r13, and t3-r133, respectively, of the logical device 450. The tier 451 can be in the path between the logical devices 410 and 420.

The score for the logical device 410 can be calculated based at least on a combination of the scores of the network devices of the logical device 410. The individual scores of the network devices can be calculated by recursively analyzing properties of the network devices in the neighboring tiers of the individual network devices. As a specific example, the score of the network device t2-r1 of the logical device 410 can be based on the properties of the network devices one and/or two hops away. The network devices one hop away can be selected from the devices in the tiers 411 and 451. The network devices two hops away can be selected from the devices in the tier 422.

Figure 5:
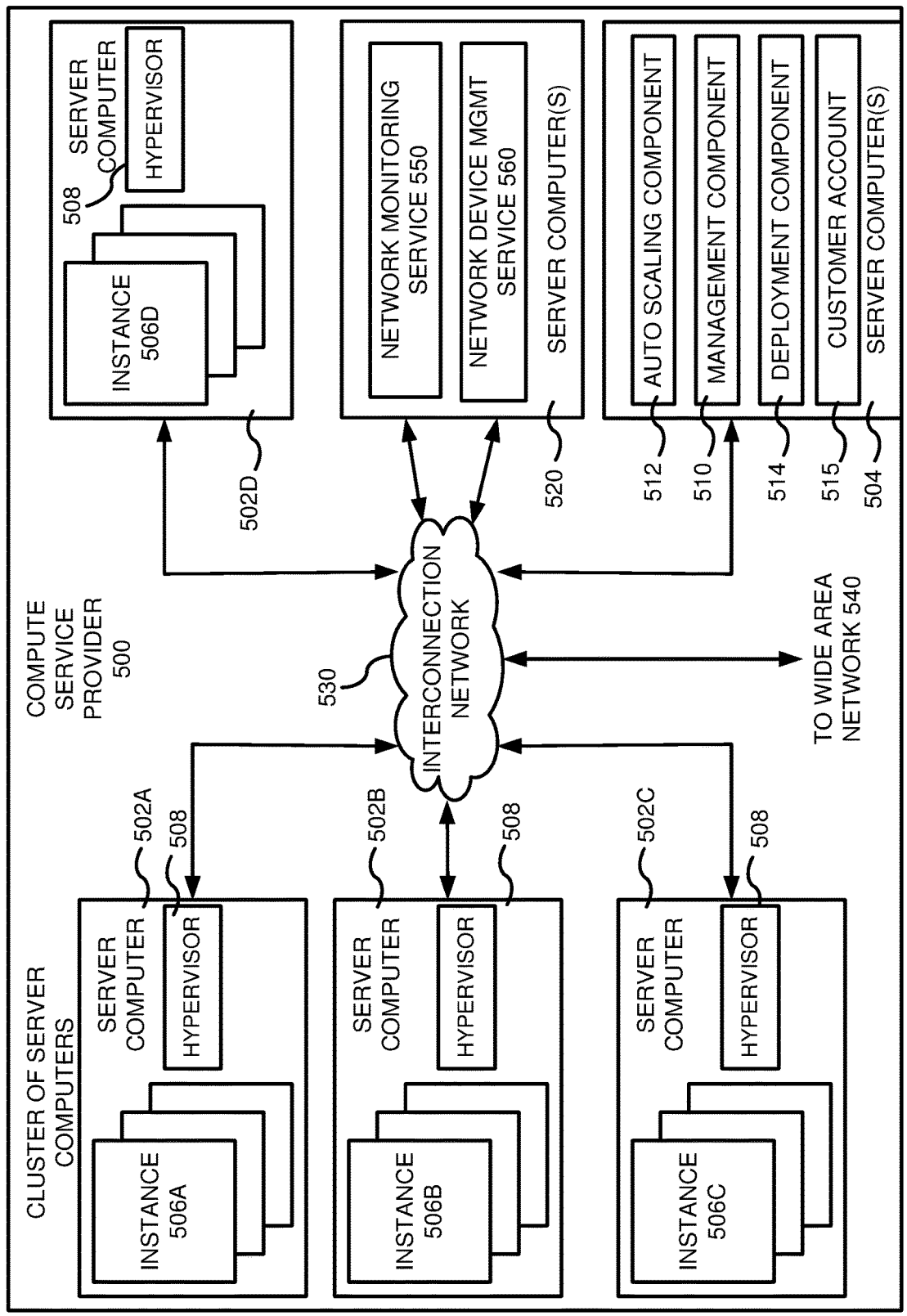
FIG. 5 is an example system diagram showing a plurality of virtual machine instances running in a multi-tenant environment including a network monitoring service.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

An interconnection network 530 can be utilized to interconnect the server computers 502A-502D and the server computer(s) 504. The interconnection network 530 can include a plurality of interconnected network devices organized as a multi-tier interconnection network having one or more logical devices, such as a Clos, folded-Clos, fat-tree, butterfly, flattened-butterfly, or dragonfly network, for example. The server computers 502A-502D and the server computer(s) 504 can be connected to the network devices of the interconnection network 530 by network links that can be organized by interface groups. A Wide Area Network (WAN) 540 can be connected to externally facing ports of the interconnection network 530 so that end users can access the compute service provider 500. It should be appreciated that the network topology illustrated in FIG. 5 has been simplified and that many more networks and networking devices can be utilized to interconnect the various computing systems of the service provider 500.

One or more server computers 520 can be reserved for executing software components for managing the operation of the interconnection network 530. For example, the server computer 520 can execute a network monitoring service 550 and a network device management service 560. The network monitoring service 550 and the network device management service 560 can be network-accessible services.

The network monitoring service 550 can be used to monitor and record the status of the network devices and analyze whether various actions can be performed to a network device or a group of network devices. As one example, the network monitoring service 550 can include a Simple Network Management Protocol (SNMP) manager for communicating with SNMP agents executing on the respective network devices. Information about the network devices can be collected by pulling information from the network devices (e.g., transmitting an SNMP query to the network device and collecting the response from the network device), ingesting alarm or status data that is reported by the network devices, and/or collecting status information from another network-accessible service. The type of information collected can include the operational status of the network devices (e.g., up, down, or shifted) and the operational status of the network links of the network devices (e.g., up, down, utilization).

The network monitoring service 550 can generate a topology corresponding to the plurality of interconnected network devices of the network 530. The topology can be hierarchical so that the network devices are grouped into logical devices and tiers. The collected status information can be annotated on the topology so that the status or health of the interconnection network 530 can be determined. As a specific example, the amount of traffic passing through each network link can be collected from the network devices every five minutes. The current, average, or peak traffic (such as the ninety-ninth percentile of traffic over the last seven days) for each link and/or interface group can be calculated and annotated on the network topology.

The network monitoring service 550 can receive a request to perform an action on a particular logical device, analyze whether the action can be performed, and transmit a response indicating whether the action can be performed. For example, the request can include a reference to a logical device, a reference to one or more network devices, a reference to tier, and/or an action to perform. As one specific example, the action to performed can be to deploy network configuration data or a software update to all of the network devices of a logical device. The action can specify that the network devices will be removed from service one at a time during the deployment, one network device per tier will be removed from service at a given time during the deployment, and so forth. As another specific example, the action to be performed can be to remediate an issue for a given network device of a logical device. Traffic to the network device to be remediated can be shifted away from the network device, the device can be remediated, and then traffic can shifted back onto the network device.

Determining whether the action can be performed can include calculating a score for the particular logical device based on a combination of scores of the individual network devices of the particular logical device. The scores of the individual network devices can be calculated by using the generated topology to recursively analyze properties of neighboring network devices of the individual network devices. The scores of all of the network devices of the logical device can be used to calculate the score for the particular logical device or the scores of a portion of the network devices of the logical device can be used to calculate the score for the particular logical device. For example, a device to be taken out of service can be given a score of zero to reflect the action's impact on the logical device. The score for the particular logical device can be compared to a threshold to determine whether the action can be performed. As one example, the action can be capable of being performed when the score is greater than a predefined threshold, such as 75% or 90%. The threshold can be selected based on the type of action to perform so that some actions can be performed for a lower threshold than other actions. Additionally or alternatively, the threshold can be selected based on a utilization of the logical device. For example, a logical device with low utilization (e.g., with light traffic) can have a lower threshold than the same type of logical device with a higher utilization (e.g., with heavier traffic).

The network device management service 560 can perform the actions on the logical devices and/or network devices. For example, the network device management service 560 can transmit a request to perform an action on a particular logical device to the network monitoring service 550. If the network monitoring service 550 transmits a response indicating that the action can be performed, the network device management service 560 can perform the action. Performing an action on a network device can include: collecting a current configuration state of the network device; comparing the collected configuration state to an expected configuration state and proceeding only when the collected and expected states match; shifting traffic off of the network device by causing routing tables of neighboring network devices to be updated with paths around the shifted network device; downloading a script, configuration data, or software to the network device; installing, executing, or programming the network device with the downloaded information; comparing an updated software state of the network device to an expected software state; signaling that the network device was successfully updated when the updated software state matches the expected software state; and shifting traffic back on the network device by causing the routing tables of neighboring network devices to be updated with paths using the updated network device. After the action is performed on the network device, the network device can operate in accordance with the updated software and/or configuration data. By using the network monitoring service 550 and the network device management service 560 to update the network devices, the network traffic flowing between the different server computers 502A-502D through the interconnection network 530 can continue to flow during an update of the network devices. Thus, the availability and reliability of the interconnection network 530 can potentially be increased.

Figure 6:
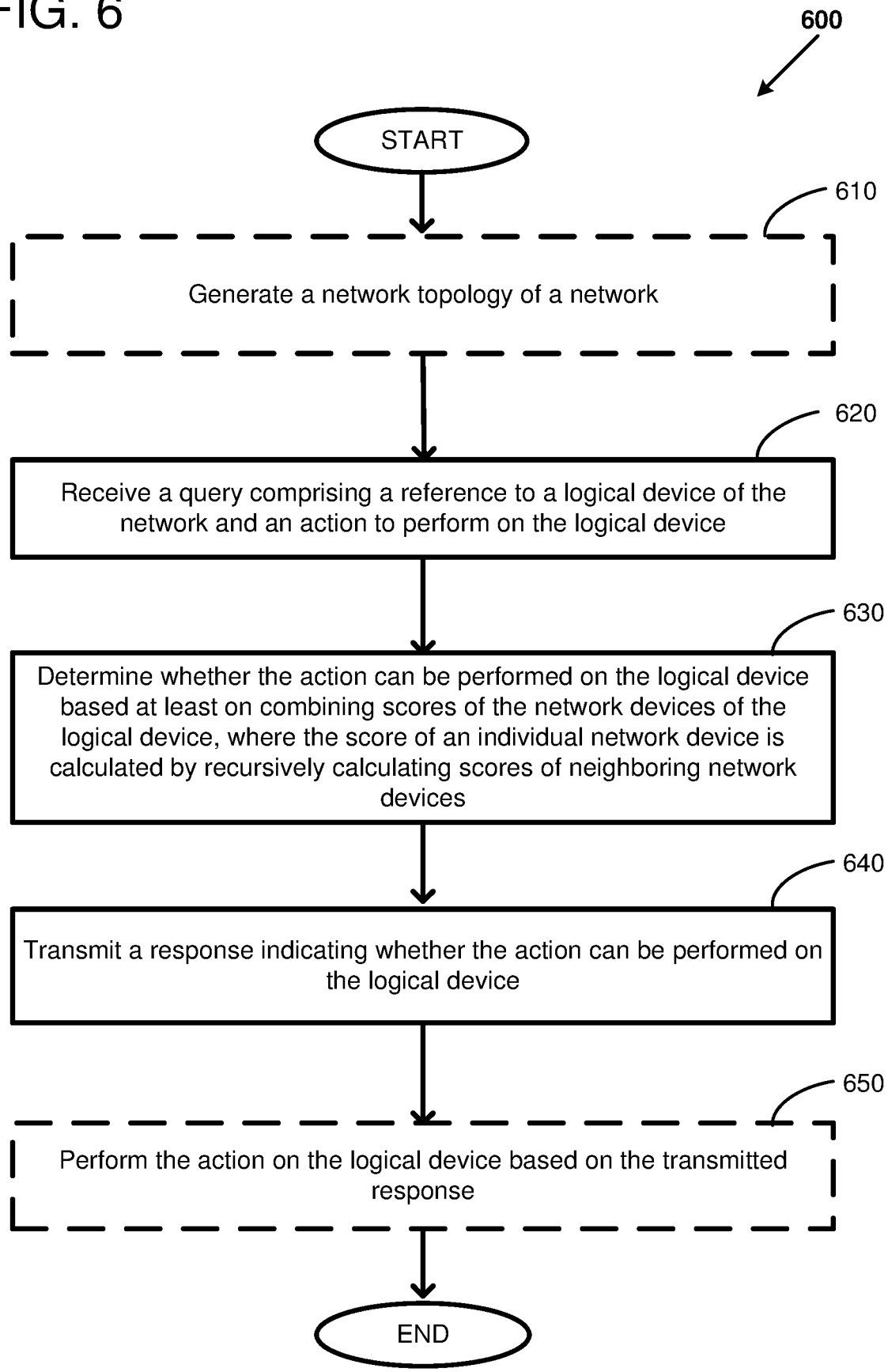
FIG. 6 shows a flow diagram of an example method using a network monitoring service.

FIG. 6 shows a flow diagram of an example method 600 using a network monitoring service. At 610, a network topology of a network can optionally be generated. Alternatively, the network topology can be generated by another service, and the network monitoring service can receive the network topology. The network topology is a representation of the topological structure of the network describing the connectivity of the nodes (e.g., network devices) and the network links. The network topology can include hierarchical components. For example, a logical device can include multiple interconnected network devices. As another example, a tier can include network devices that connect to a neighboring tier using redundant or alternative network connections. The network topology can be annotated with operational characteristics of the network devices and network links, such as an up status, a down status, a shifted status, a capacity, and a utilization.

At 620, a query can be received, where the query comprises a reference to a logical device of a network and an action to perform on the logical device. For example, the query can be transmitted by a network modification service that will perform the action if the action can be performed with little or no impact to customers using the network. Using the annotated or non-annotated network topology and the reference to the logical device, the neighboring network devices and logical devices can be identified. The operational characteristics of the identified network devices and network links can be determined using the annotations of the annotated network topology. A threshold score can be selected based on a type of the logical device, a utilization of the logical device, the action to be performed, and/or a type of a neighboring logical device.

At 630, it can be determined whether the action can be performed on the logical device. The determination can be based at least on combining scores of the network devices of the logical device, where the score of an individual network device is calculated by recursively calculating scores of neighboring network devices of the individual network device. The score of a given network device can be calculated based on the operational characteristics of the network device, its neighboring network devices, and the network links connecting the network device to its neighboring network devices. The score of a given network device can be calculated based on a type of logical device that connects to the given network device. For example, a depth of the of recursion for recursively calculating the scores of the neighboring network devices can be based on the type of the logical device incorporating one or more of the neighboring network devices. As a specific example, the depth of recursion can be at least two hops when the type of logical device incorporating one or more of the neighboring network devices is a partially-meshed logical device. The depth of recursion can be one hop when the type of logical device incorporating one or more of the neighboring network devices is a fully-meshed logical device. Thus, the score of a given network device can be a one-hop or a two-hop score depending on the type of logical device incorporating the given network device.

The individual scores of the network devices of the logical device can be combined in various ways. For example, a minimum, an average, a weighted average, or a sum of a portion or all of the individual scores can be used to combine the individual scores. As a specific example, the scores can be combined by calculating a minimum of the scores of the network devices within a tier of the logical device. The score for the logical device can be a minimum of the scores of the tiers of the logical device. The score for the logical device can be compared to the threshold score selected at 620. When the score for the logical device exceeds or is greater than the threshold score, it can be indicated that the action can be performed on the logical device. However, when the score for the logical device does not exceed or is less than the threshold score, it can be indicated that it is advisable to not perform the action on the logical device. At 640, a response indicating whether the action can be performed on the logical device can be transmitted from the network monitoring service.

At 650, the action can optionally be performed on the logical device after it is determined that the action can be performed. For example, a network modification service can cause the action to be performed on the logical device. As one example, the action to be performed can include updating software and/or configuration data of at least one network device of the logical device. As another example, the action to be performed can be to change a service status of the logical device. Specifically, the logical device can be taken out of service or the logical device can be put back into service.

Figure 7:
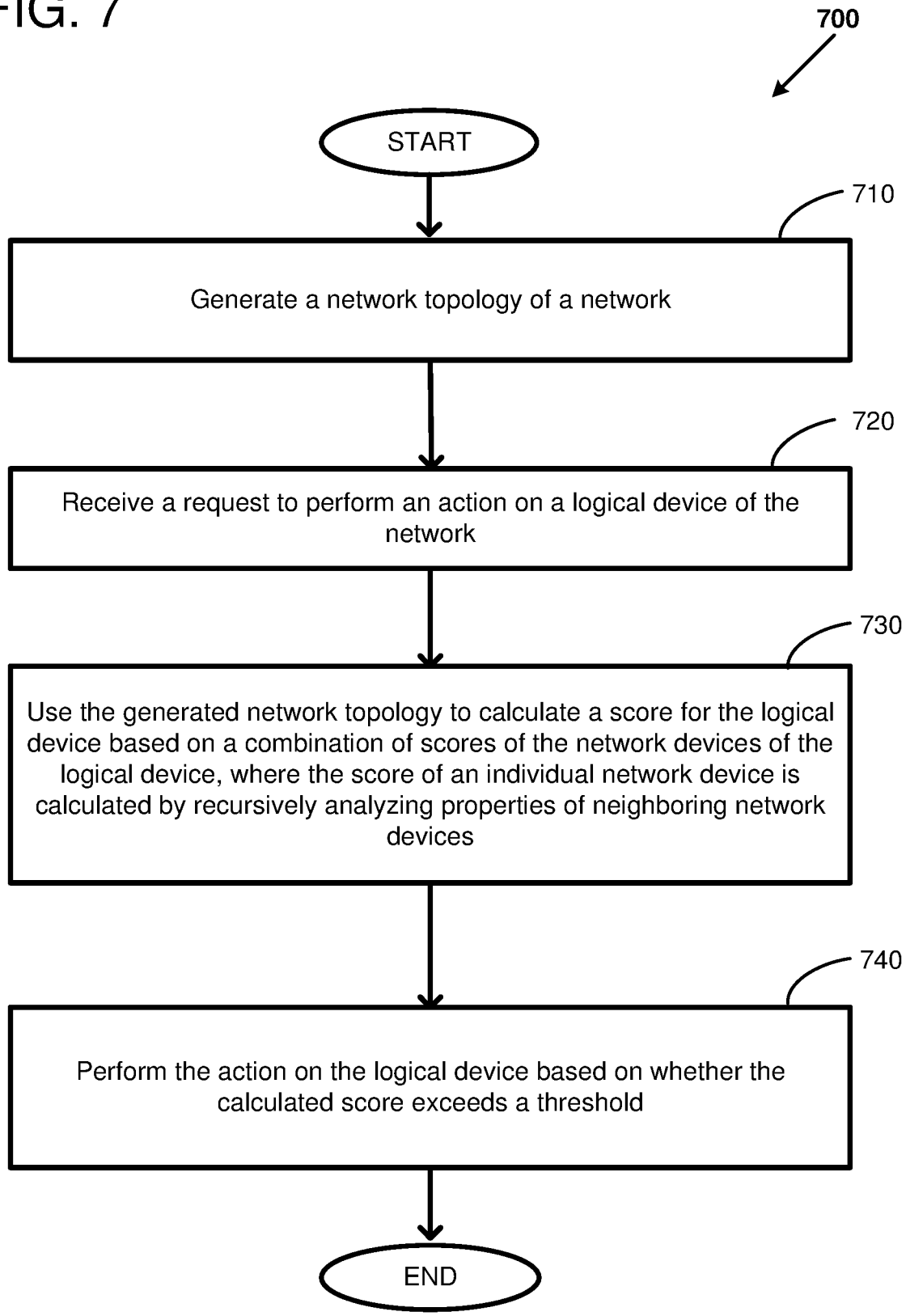
FIG. 7 shows a flow diagram of an example method for managing a communications network.

FIG. 7 shows a flow diagram of an example method 700 for managing a communications network. At 710, a network topology of the communications network can be generated. The communications network includes multiple network devices arranged in one or more tiers. The network topology represents the topological structure of the network describing the interconnectivity of the network devices, the network links, and the tiers of the network. Additionally, the network can be organized or grouped by logical devices, where a logical device includes a group of network devices. As a specific example, a logical device can include a group of network devices that are arranged in multiple tiers, and each network device of a first tier is interconnected with every network device of a second tier so that the first tier and the second tier are fully meshed. The generated network topology can be annotated with properties, such as operational characteristics, of the network devices and network links.

At 720, a request to perform an action on a logical device of the network can be received. Using the annotated or non-annotated network topology and the reference to the logical device, the neighboring network devices and logical devices can be identified. The operational characteristics of the identified network devices and network links can be determined using the annotations of the annotated network topology. A threshold score can be selected based on a type of the logical device, a utilization of the logical device, a status of the logical device (e.g., in service or out of service), the action to be performed, and/or a type of a neighboring logical device. Thus, the threshold score can be a predefined threshold score or a dynamically calculated threshold score.

At 730, the generated network topology can be used to calculate a score for the logical device based at least on a combination of scores of the network devices of the logical device. The score of an individual network device can be calculated using a measure of network capacity through neighboring tiers. In particular, the measure of network capacity can be calculated by recursively analyzing properties of the network devices in the neighboring tiers of the individual network device. The connections between the tiers can provide multiple redundant paths to forward network traffic using a LAG or ECMP routing. Thus, the health of the network devices within a tier can indicate an ability to forward packets through the network. Tiers can be connected in various different ways. For example, tiers can be fully meshed where every device of one tier is connected to every device of the connected tier. As another example, tiers can be partially meshed where a portion of the devices of one tier are connected to all or a portion of the devices of the connected tier. The score of a given network device can be calculated based on a type of connection to a neighboring tier. For example, a depth of recursion for recursively analyzing properties of the network devices in the neighboring tiers can be based on the type of connection between the given network device and the neighboring tier. As a specific example, the depth of recursion can be at least two hops when the neighboring tiers are partially-meshed. The depth of recursion can be one hop when the neighboring tiers are fully-meshed. The individual scores of the network devices of the logical device can be combined in various ways. For example, a minimum, an average, a weighted average, or a sum of a portion or all of the individual scores can be used to combine the individual scores. As a specific example, the scores can be combined by calculating a minimum of the scores of the network devices within a tier of the logical device. The score for the logical device can be a minimum of the scores of the tiers of the logical device.

At 740, the action can be performed on the logical device based on whether the calculated score exceeds a threshold. For example, the score for the logical device can be compared to the threshold score selected at 720. When the score for the logical device exceeds or is greater than the threshold score, the action can be performed on the logical device. However, when the score for the logical device does not exceed or is less than the threshold score, the action will not be performed on the logical device. As one example, the action to be performed can include updating software and/or configuration data of at least one network device of the logical device. As another example, the action to be performed can be to change a service status of the logical device. Specifically, the logical device can be taken out of service or the logical device can be put back into service.

Figure 8:
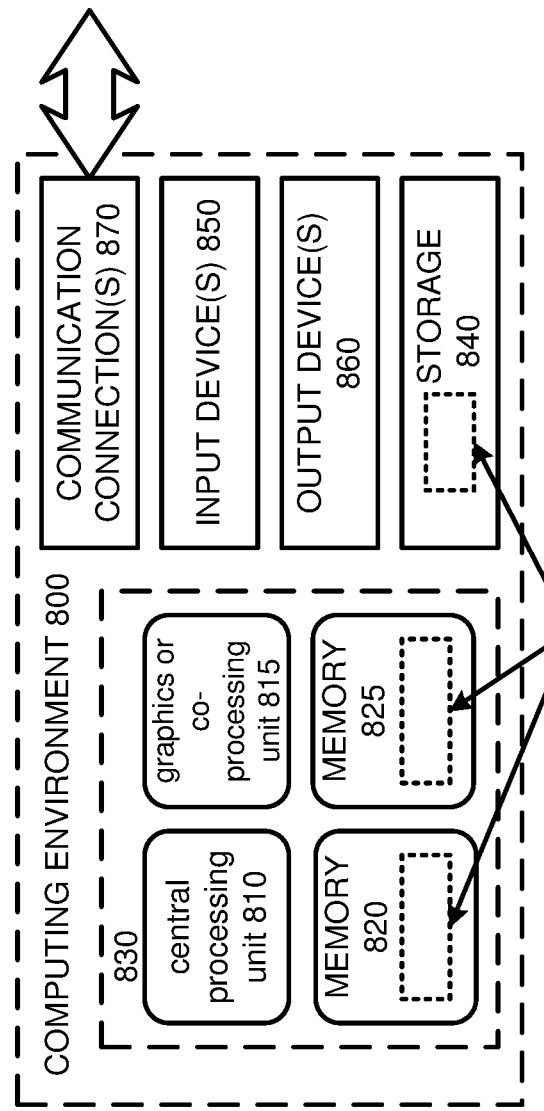
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. One or more computer readable storage media including instructions thereon for executing a method of managing a communications network, the method comprising:
    generating a network topology of the network, wherein the network comprises a plurality of network devices arranged in a plurality of interconnected tiers;
    receiving a request to perform an action on a logical device of the network, the logical device comprising a group of network devices from the plurality of network devices of the network;
    annotate respective operation statuses of the plurality of network devices to the generated network topology to generate an annotated network topology;
    using the generated annotated network topology to calculate a score for the logical device based on a combination of scores of the network devices of the logical device, the score of an individual network device calculated using a measure of network capacity through neighboring tiers, the measure of network capacity calculated by recursively analyzing properties of network devices in the neighboring tiers of the individual network device, wherein calculating the score is based on a type of the logical device including whether the logical device is a partially-meshed logical device or a fully-meshed logical device; and
    performing the action on the logical device based on whether the calculated score exceeds a threshold.

2. The one or more computer readable storage media of claim 1, wherein calculating a score for the logical device based on a combination of scores of the network devices comprises calculating a minimum of the scores of the network devices within a tier of the logical device.

3. The one or more computer readable storage media of claim 1, wherein the action to perform on the logical device is to deploy an updated configuration or software patch to each of the network devices of the logical device.

4. The one or more computer readable storage media of claim 1, wherein the action to perform on the logical device is change a service status of the logical device.

5. The one or more computer readable storage media of claim 1, wherein the threshold is selected based on a type of the logical device, the action to be performed, a utilization of the logical device, or a type of a neighboring logical device.

6. The one or more computer readable storage media of claim 1, wherein recursively analyzing properties of network devices in neighboring tiers of the individual network device is performed to a depth of two hops.

7. A method of a network monitoring service, the method comprising:
receiving a query comprising a reference to a logical device of a network and an action to perform on the logical device, the logical device comprising a plurality of interconnected network devices;
determining whether the action will be performed on the logical device based on combining scores of the network devices of the logical device, wherein the score of an individual network device is calculated by recursively calculating scores of neighboring network devices of the individual network device, wherein the score of the individual network device is dependent on a number of available interfaces of the individual network device, and wherein a number of network hops traversed when calculating the score of the individual network device is a function of a type of a respective logical device that incorporates the individual network device or a respective logical device that incorporates the neighboring network devices; and
transmitting a response indicating whether the action is to be performed on the logical device.

8. The method of claim 7, wherein combining scores of the network devices of the logical device comprises calculating a minimum of the scores of the network devices within a tier of the logical device.

9. The method of claim 7, wherein the number of network hops traversed when calculating the score of the individual network device is one hop when the type of the respective logical device that incorporates the individual network device or the respective logical device that incorporates the neighboring network devices is a fully-meshed logical device.

10. The method of claim 7, wherein a depth of recursion for recursively calculating scores of neighboring network devices is at least two hops when the type of logical device incorporating one or more of the neighboring network devices is a partially-meshed logical device.

11. The method of claim 7, wherein the plurality of interconnected network devices of the logical device are arranged in multiple tiers, and each network device of a first tier is fully meshed with every network device of a second tier.

12. The method of claim 7, further comprising:
performing the action on the logical device after it is determined that the action can be performed.

13. The method of claim 7, wherein determining whether the action can be performed on the logical device comprises comparing the combined scores of the network devices of the logical device to a threshold.

14. The method of claim 13, wherein the threshold is selected based on a type of the logical device, the action to be performed, or a type of a neighboring logical device.

15. A system for routing network traffic, the system comprising:
a plurality of interconnected network devices; and
a network health service executing on one or more host server computers and configured to:
generate a topology corresponding to the plurality of interconnected network devices, wherein the topology comprises a plurality of logical devices and each logical device comprises a subset of the plurality of interconnected network devices;
receive a request to perform an action on a particular logical device;
calculate a score for the particular logical device based on a combination of scores of the individual network devices of the particular logical device, the scores of the individual network devices calculated by using the generated topology to recursively analyze properties of neighboring network devices of the individual network devices, wherein the scores are further based on a number of available interfaces on the individual network devices, and wherein, for each individual network device of the particular logical device, the score of the individual network device is calculated based on the properties of the neighboring network devices that are a respectively selected number of hops away from the individual network device, the number of hops being selected for each individual network device as a function of a type of the logical device incorporating the individual network device or a type of logical device incorporating one or more of the neighboring network devices of the individual network device; and
transmit a response indicating whether the action will be performed on the logical device, the response based on the calculated score for the particular logical device.

16. The system of claim 15, wherein one of the scores of the individual network devices is a two-hop score.

17. The system of claim 15, wherein the particular logical device is a multi-tier architecture selected from a Clos, folded-Clos, fat-tree, butterfly, flattened-butterfly, or dragonfly network.

18. The system of claim 15, wherein, for each individual network device of the particular logical device, the number of hops selected for the individual network device is one hop when the type of the logical device incorporating the individual network device is a fully-meshed logical device, and at least two hops when the type of the logical device incorporating one or more of the neighboring network devices is a partially-meshed logical device.

19. The system of claim 15, wherein the action to perform on the logical device is to deploy an updated configuration or software patch to each of the network devices of the logical device in a sequence where network devices in different tiers are deployed concurrently.

20. The system of claim 15, wherein the logical device comprises a plurality of tiers, and wherein calculating the score for the particular logical device comprises calculating a minimum of the non-zero scores of the network devices within a tier of the logical device, and calculating a minimum of the scores of the tiers of the logical device.

\* \* \* \* \*